(12) United States Patent
Ito

(10) Patent No.: US 7,530,795 B2
(45) Date of Patent: May 12, 2009

(54) FLUID CONTROL MECHANISM

(75) Inventor: Hirohito Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 10/864,473

(22) Filed: Jun. 10, 2004

(65) Prior Publication Data

US 2004/0257668 A1 Dec. 23, 2004

(30) Foreign Application Priority Data

Jun. 13, 2003 (JP) .............................. 2003-168539

(51) Int. Cl.
*F04B 19/24* (2006.01)

(52) U.S. Cl. .................. 417/209; 417/207; 417/238; 250/251; 250/491.1

(58) Field of Classification Search .............. 417/207, 417/209, 238; 359/665; 250/251, 491.1
See application file for complete search history.

(56) References Cited

U.S. PATENT DOCUMENTS

| | | | |
|---|---|---|---|
| 3,670,500 A | 6/1972 | Schultz | 60/57 R |
| 4,792,283 A | 12/1988 | Okayasu | 417/52 |
| 5,100,627 A * | 3/1992 | Buican et al. | 422/108 |
| 5,367,878 A * | 11/1994 | Muntz et al. | 60/512 |
| 5,599,502 A * | 2/1997 | Miyazaki et al. | 422/82.01 |
| 5,677,709 A | 10/1997 | Miura et al. | 345/161 |
| 5,886,684 A | 3/1999 | Miura et al. | 345/161 |
| 5,973,471 A | 10/1999 | Miura et al. | 318/640 |
| 6,071,081 A * | 6/2000 | Shiraishi | 417/52 |
| 6,251,691 B1 * | 6/2001 | Seul | 436/534 |
| 6,416,190 B1 * | 7/2002 | Grier et al. | 359/614 |
| 6,540,895 B1 * | 4/2003 | Spence et al. | 204/450 |
| 6,709,869 B2 * | 3/2004 | Mian et al. | 436/45 |
| 6,721,472 B2 | 4/2004 | Kim | 385/16 |
| 6,802,489 B2 | 10/2004 | Marr et al. | 251/129.14 |
| 6,869,273 B2 * | 3/2005 | Crivelli | 417/53 |
| 2002/0185592 A1 * | 12/2002 | Grier et al. | 250/251 |
| 2003/0086790 A1 | 5/2003 | Ma | 417/209 |

FOREIGN PATENT DOCUMENTS

| | | |
|---|---|---|
| JP | 60-155471 | 8/1985 |
| JP | 61-31679 | 2/1986 |
| JP | 3-274488 | 12/1991 |

(Continued)

OTHER PUBLICATIONS

J. Glückstad, et al., "Vision-Guided Manipulation of Colloidal Structures", Proc. of SPIE, vol. 5106, pp. 46-52 (2003).

*Primary Examiner*—Devon C Kramer
*Assistant Examiner*—Leonard J Weinstein
(74) *Attorney, Agent, or Firm*—Fitzpatrick, Cella, Harper & Scinto

(57) ABSTRACT

A fluid control mechanism includes a laser irradiation control unit to control irradiation of a light beam generated by a laser generation unit, and a liquid tank, having at least one liquid passing port and a lens to collect the light beam in the liquid tank, to hold liquid. The laser irradiation control unit emits the light beam to the lens to collect the light beam by the lens, thereby causing thermal expansion of the liquid in the liquid tank, to control inflow/outflow of the liquid via the liquid passing port.

4 Claims, 7 Drawing Sheets

FOREIGN PATENT DOCUMENTS

| | | |
|---|---|---|
| JP | 4-61195 | 2/1992 |
| JP | 04/272481 | 9/1992 |
| JP | 04-322183 | 11/1992 |
| JP | 4-322183 | 11/1992 |
| JP | 4-331487 | 11/1992 |
| JP | 5-168265 | 7/1993 |
| JP | 5-240155 | 9/1993 |
| JP | 5-280500 | 10/1993 |
| JP | 6-50300 | 2/1994 |
| JP | 6-78572 | 3/1994 |
| JP | 7-002034 | 1/1995 |
| JP | 7-287172 | 10/1995 |
| JP | 08-061218 | 3/1996 |
| JP | 2001-252897 | 9/2001 |
| JP | 3274488 | 2/2002 |
| JP | 2002-228954 | 8/2002 |
| WO | WO 00/37165 | 6/2000 |
| WO | WO 02/38262 | 5/2002 |
| WO | WO 2004/016948 | 2/2004 |

* cited by examiner

F I G. 5A
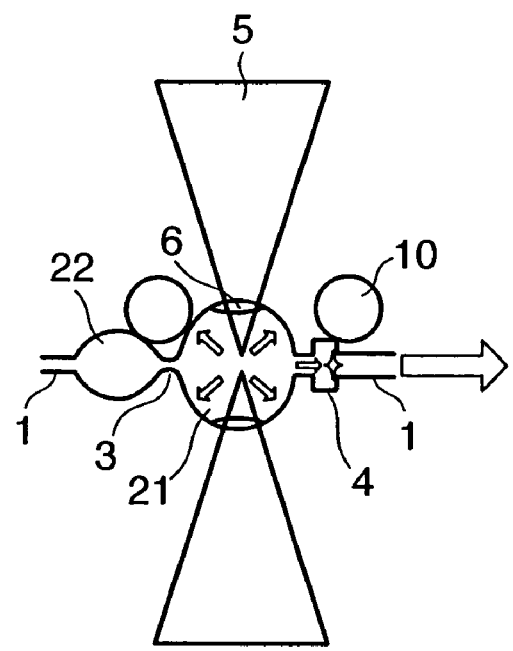
F I G. 5B
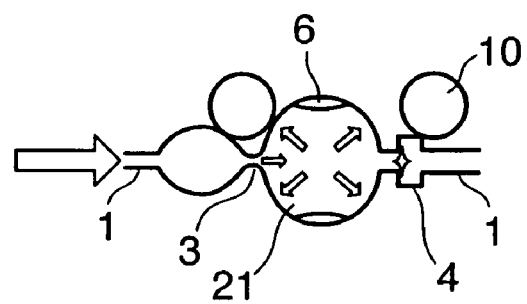
F I G. 5C
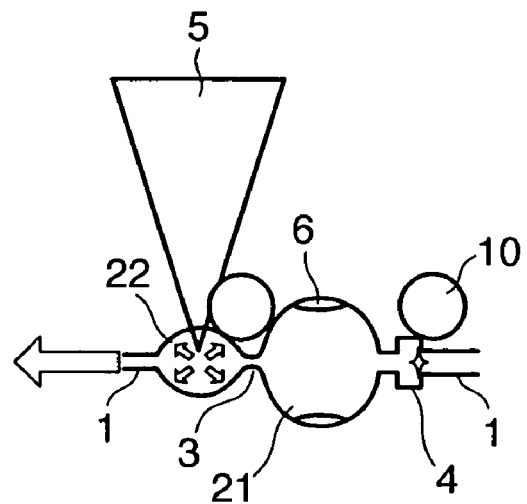

FLUID CONTROL MECHANISM

CLAIM OF PRIORITY

This application claims priority under 35 U.S.C. §119 from Japanese Patent Application No. 2003-168539, entitled "A Fluid Control Mechanism" and filed on Jun. 13, 2003, the entire contents of which are hereby incorporated by reference herein.

FIELD OF THE INVENTION

The present invention relates to a fluid control mechanism preferably employed in the field of biotechnology or the like for handling cells and DNA where an operation of a slight amount of fluid must be controlled.

BACKGROUND OF THE INVENTION

As disclosed in Japanese Patent Application Laid-Open No. 07-287172, in a case where a cell is handled under a microscope, a manipulator system is employed. Note that if DNA solution is injected into the cell, a micro manipulator system having a micro manipulator where micro needle is provided on one side and a trapping needle is provided on the other side, and a microscope for monitoring the operation, is employed. In a general micro manipulator system, the minute tools such as the micro needle and the trapping needle are operated within the field of the microscope, and a video image of the operation is displayed on a CRT display or the like. While the display is observed, predetermined processing is performed on the minute sample such as a cell placed in a container such as a Petri dish. Upon pipetting or injection, a pipette or injector attached to a mechanical micro manipulator is employed.

Further, as a technique of trapping a cell or DNA molecule in liquid, laser trapping technique is well known. The technique is based on a principle that light is refracted or reflected on the surface of a minute particle having a different refractive index from that of peripheral medium, thereby the momentum of photon is changed, then the change is transmitted to the minute particle by the low of momentum conservation and the momentum of the minute particle is changed. The minute particle receives a force in the focusing direction of laser light and trapped on the focus point of the laser light. Further, the trapped minute particle can be operated by moving the focus point of the laser light. Thus, since the laser light can be collected by an objective lens of a microscope and the minute particle can be trapped under the microscopic field, this technique is appropriate to operation of cells and DNA under a microscope.

According to this technique, as the sample can be handled in non-contact state, there is little influence of mechanical precision and vibration in the case of mechanical manipulator. Further, as a subject of trapping, a so-called micro tool such as a small polystyrene ball can be used. In some cases, a cell is attached to a laser-trapped micro tool and is indirectly operated.

Further, as disclosed in Japanese Patent No. 3274488, as a micro-drive actuator other than the laser trap, various types of micro actuators such as an electrostatic actuator utilizing an electrostatic force, a piezoelectric actuator using a piezoelectric device, a shape memory alloy actuator using a shape memory alloy, and a high polymer actuator utilizing elastic deformation of high polymer have been developed.

However, upon pipetting or injection, a high-level technique and skilled art are required, and the efficiency of operation is very low due to the following problems.

1) A positioning operation is difficult due to influence of mechanical precision and vibration of a manipulator separately supported from the field of microscope.
2) As the position in a heightwise direction cannot be grasped without difficulty under a microscope, positioning is difficult.
3) In a pipette or injector, as a tip portion for discharge or suction is away from an operating portion, the elasticity of tube, viscosity of driving liquid, content of bubbles and the like increase individual specificity and degrade precision.

Further, as a manipulator or the like is required, the apparatus is a complicated and high-price apparatus.

An advanced micro tool may be employed to perform the above operations, however, at the present time, it is impossible by the micro tool to perform other operations than to move attached cell, since a driving mechanism necessary for high performance of micro tool has a complicated structure and cannot be downsized without difficulty, and further, any external power must be supplied to the tool but supply means has many problems.

SUMMARY OF THE INVENTION

The present invention has been made in consideration of the above situation, and provides a fluid control mechanism and a fluid control method which can be comparatively easily downsized and does not require external power supply means.

The fluid control mechanism according to the present invention to solve the above-described problems is a fluid control mechanism comprising: a laser irradiation control unit to control irradiation of a light beam generated by a laser generation unit; and a liquid tank unit, having at least one liquid passing port and a lens to collect the light beam in the liquid tank unit, to hold liquid; wherein the laser irradiation control unit emits the light beam to the lens to collect the light beam with the lens, to cause thermal expansion of the liquid in the liquid tank unit, thereby controls inflow/outflow of the liquid via the liquid passing port.

Further, the fluid control mechanism according to the present invention is a fluid control mechanism having a liquid tank unit, with at least one liquid passing port, to hold liquid, comprising: a beam irradiation control unit to control irradiation of at least one light beam to supply energy via space in a non-contact state; and plural light trap units for positioning; wherein the beam irradiation control unit emits the light beam to the liquid tank unit thereby controls inflow/outflow of the liquid via the liquid passing port, and emits the light beam on the light trap units thereby performs positioning of the fluid control mechanism.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIGS. 5A to 5C are schematic diagrams showing the fluid control mechanism according to a third embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1A:
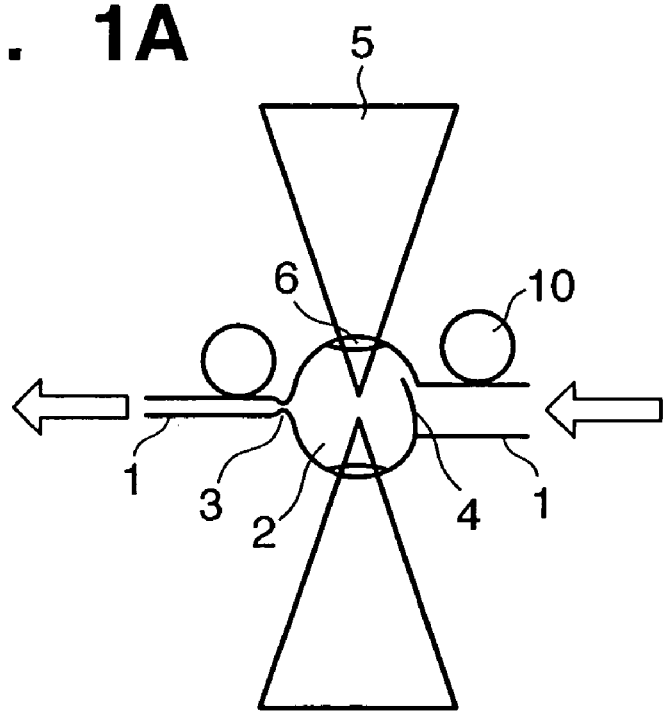
FIGS. 1A and 1B are schematic diagrams showing a fluid control mechanism according to a first embodiment of the present invention.
Figure 1B:
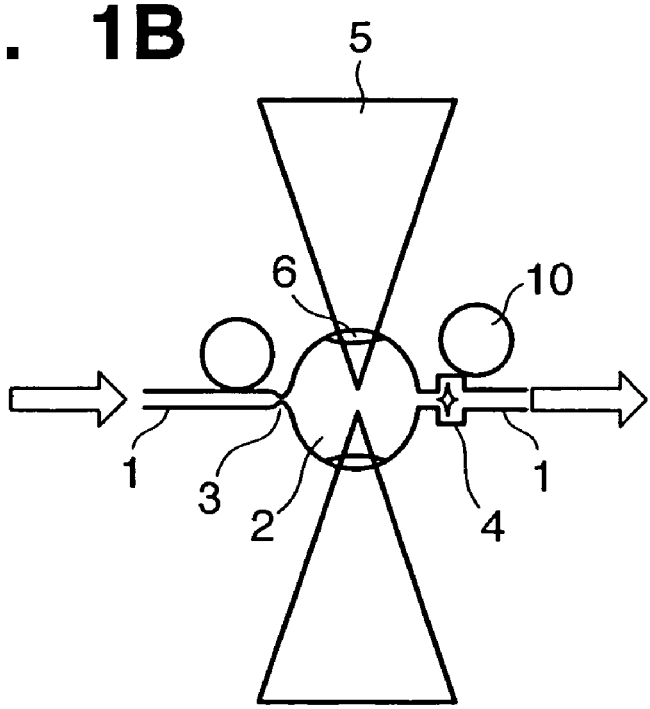

FIGS. 1A and 1B are schematic diagrams showing a fluid control mechanism according to a first embodiment of the present invention. In the present embodiment, a ball-shaped liquid tank 2 is formed in the middle of a minute conduits 1 of glass or the like. A restrictor 3 is formed by narrowing a part of the conduit 1 on one side of the liquid tank 2. The restrictor 3 is formed such that its conduit resistance is higher than that of an open status of a check valve 4 on the other side of the conduit.

As shown in FIG. 1A, the check valve 4 on the other side of the conduit may be an elastic member with one fixed end. Otherwise, as shown in FIG. 1B, the check valve 4 may have a structure where the diameter of the conduit 1 on one side is different from that on the other side, and a float member having a greater diameter than the thinner conduit is provided. The valve is closed to inflow into the thinner conduit but not completely closed to inflow into the thicker conduit. Further, other structures than the above structures may be employed.

A condenser lens 6 is integrally formed with a wall surface (upper and lower portions in FIGS. 1A and 1B) of the liquid tank 2, such that emitted laser light 5 is efficiently guided to liquid in the tank. For this purpose, it is preferable that the condenser lens 6 has a focal distance set so as to focus inside the liquid tank 2. Further, it may be arranged such that the material or color of the wall surface of the liquid tank 2 has high light absorption efficiency. By such arrangement, thermal expansion of the liquid in the liquid tank 2 can be efficiently caused with energy of the laser light 5.

Figure 2A:
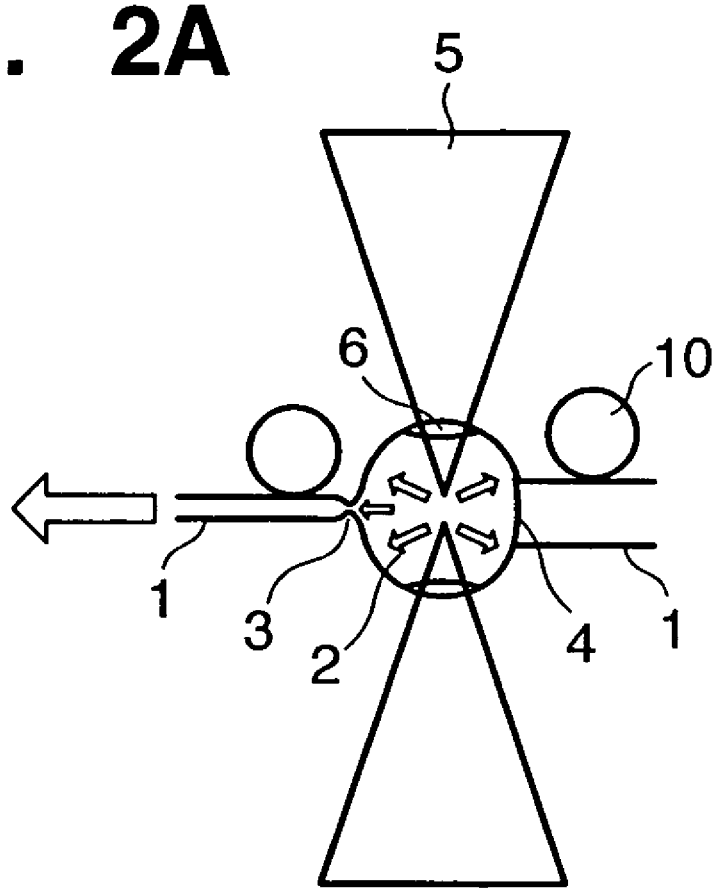
FIGS. 2A and 2B are explanatory diagrams showing the operation of the fluid control mechanism according to the first embodiment.
Figure 2B:
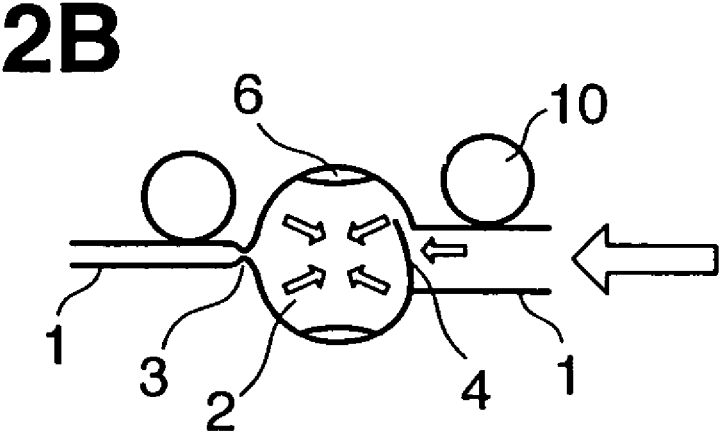

Next, the operation of the check valve 4 in the fluid control mechanism in FIG. 1A to allow the liquid to flow only in an inflow direction to the liquid tank 2 will be described with reference to FIGS. 2A and 2B. As shown in FIG. 2A, when thermal expansion of the liquid has been caused in the liquid tank 2 by irradiation of the laser light 5, in the conduit 1 on the check valve 4 side, the valve is closed so as to stop the liquid, and the liquid is pushed to the conduit on the restrictor 3 side by the thermal expansion. Next, as shown in FIG. 2B, when the irradiation of the laser light 5 has been stopped and volume contraction of the liquid has been caused in the liquid tank 2, the check valve 4 is opened and the liquid flows into the liquid tank 2. As the conduit on the restrictor 3 side has a higher conduit resistance than that of the check valve 4 in the open status, inflow from the restrictor 3 side almost does not occur. Accordingly, by repeating the irradiation of the laser light 5 and stoppage of the irradiation, the liquid flows from the check valve 4 side to the restrictor 3 side.

Figure 3A:
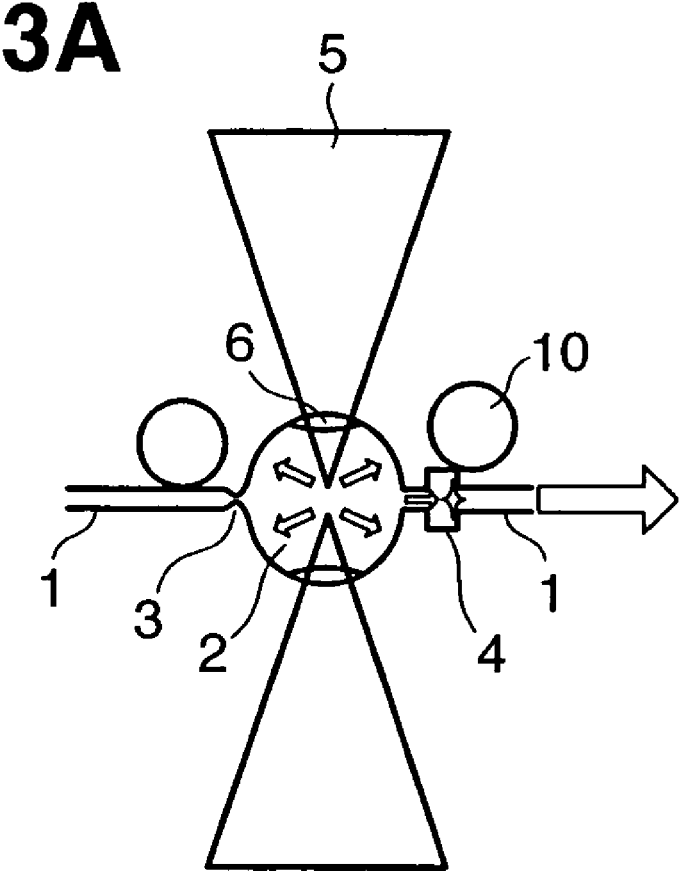
FIGS. 3A and 3B are explanatory diagrams showing the operation of the fluid control mechanism according to the first embodiment.
Figure 3B:
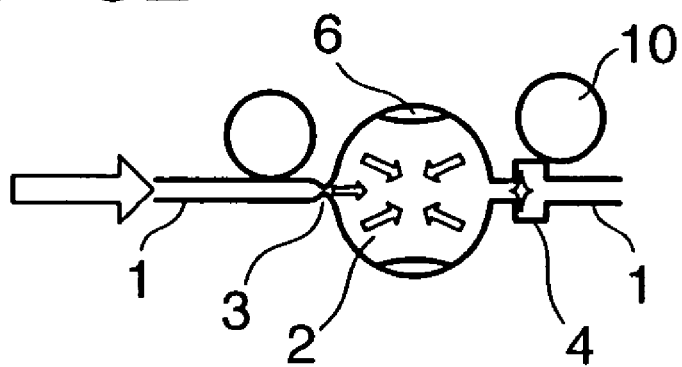

Next, the operation of the check valve 4 in the mechanism in FIG. 1B to allow the liquid to flow in only an outflow direction from the liquid tank 2 will be described with reference to FIGS. 3A and 3B. As shown in FIG. 3A, when thermal expansion of the liquid has been caused in the liquid tank 2 by irradiation of the laser light 5, the check valve 4 is opened so as to cause the liquid to flow from the conduit 1. As the conduit on the restrictor 3 side has a higher conduit resistance than that of the check valve 4 in the open status, outflow from the restrictor 3 side almost does not occur. Next, as shown in FIG. 3B, when the irradiation of the laser light 5 has been stopped and volume contraction of the liquid has been caused in the liquid tank 2, the check valve 4 is closed and the liquid flows into the liquid tank 2. Accordingly, by repeating the irradiation of the laser light 5 and stoppage of the irradiation, the liquid flows from the restrictor 3 side to the check valve 4 side.

In a conventional pipette or injector, as a tip portion for discharge or suction is away from an operating portion, the elasticity of tube, viscosity of driving liquid, content of bubbles and the like increase individual specificity and degrade precision. In operation of such tool, some experience is required. However, in the present embodiment, as solution around a tip portion (end of conduit) can be directly operated, the operation can be easily performed with high accuracy. Further, as non-contact power supply can be made with laser light, it is not necessary to provide a particular mechanism for power supply and the apparatus can be simplified.

Figure 7:
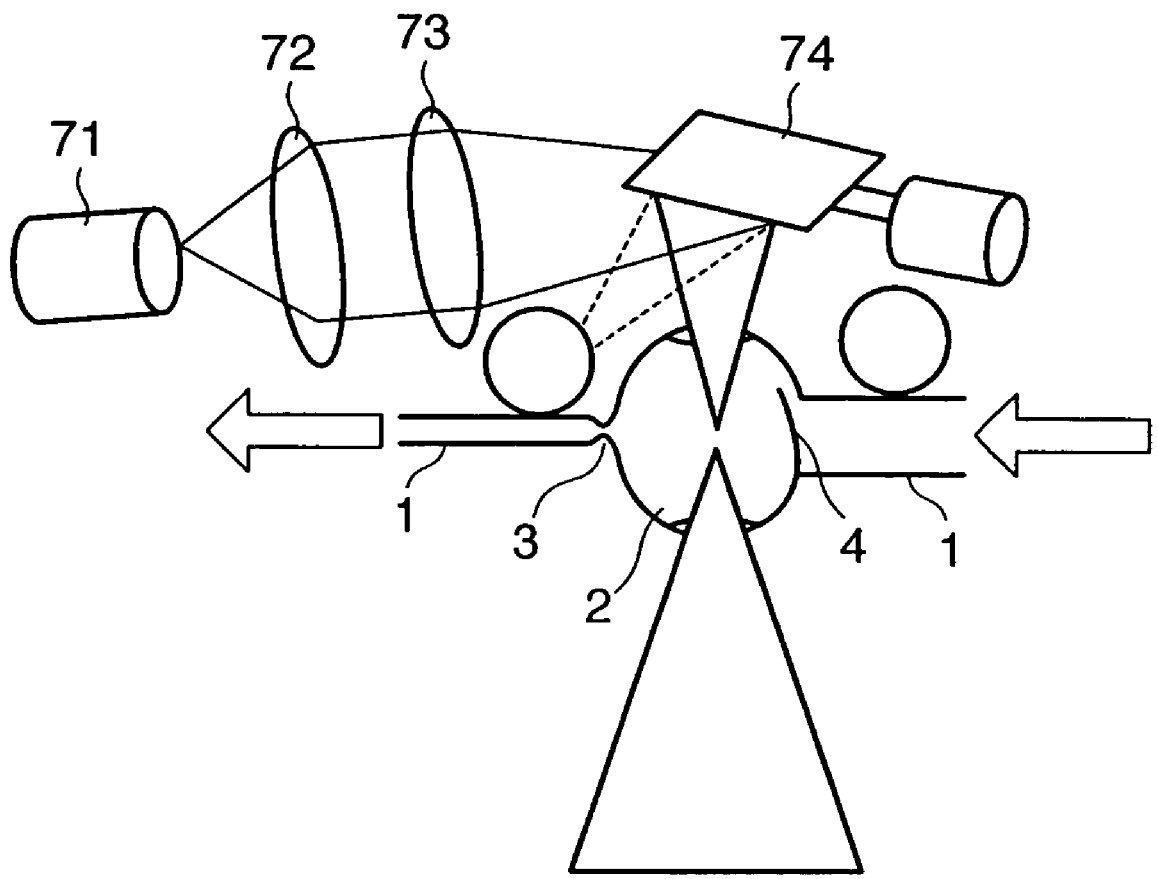
FIG. 7 is a schematic diagram showing an example of means for moving laser light.

In a case where the mechanism is used as a micro tool, it is preferable to provide a bead 10 for laser trapping. By laser trapping the bead 10, positioning of the mechanism can be freely made in a medium. The positioning can be made in an arbitrary position by 6using plural beads 10. Upon laser trapping, a polarizer such as a galvanometer mirror to change the direction of the laser light is used. The laser light is selectively emitted to the liquid tank 2 and the beads 10 by using the polarizer. FIG. 7 shows an example of means for moving laser light (laser irradiation control unit or a beam emission control unit). In FIG. 7, an irradiation position of light emitted from a laser light source 71 can be changed by a galvanometer mirror 74 via a collimator lens 72 and a condenser lens 73. In this manner, as the light source of the laser light 5 and the trapping laser light can be a common source (since the two light beams are high-intensity laser light at approximately the same level), any particular device is not necessary and the apparatus structure can be simplified. Further, different from a conventional mechanical manipulator, as positioning is made in the field of microscope by using laser trapping, the positioning can be easily performed with high accuracy. As for a heightwise direction, as the micro tool can be arrayed in the focus point position of the laser light, the positioning can be easily made at the same height.

Further, as positioning can be freely performed by using laser trapping, the free rotation of a cell attached to a pipette or coating of a particular position of a cell with an antibody by using an injector, which conventionally have not been performed without difficulty, can be easily performed.

Note that the range of application of the fluid control mechanism of the present invention is not limited to the micro tool described in the embodiment. For example, the fluid control mechanism may be used for a microchip or the like used in a medical μ-TAS (μ-total analysis system) where chemical analysis and synthesizing tools are microminiaturized by utilizing a micro machine technique.

Second Embodiment

FIGS. 4A to 4D are schematic diagrams showing the structure and operation of the fluid control mechanism according to a second embodiment of the present invention. The present embodiment differs from the first embodiment in that two fluid control mechanisms having different fluid driving directions are coupled on the restrictor side. In the first embodiment, the fluid is driven in only one fluid driving direction, whereas in the second embodiment, the fluid is bidirectionally driven with respect to a third conduit 13.

Figure 4A:
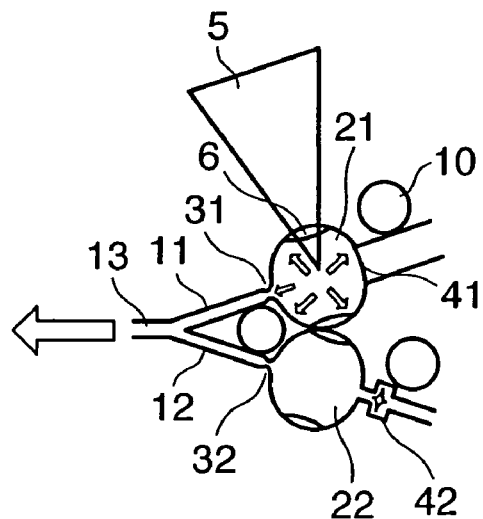
FIGS. 4A to 4D are schematic diagrams showing the fluid control mechanism according to a second embodiment of the present invention.

As shown in FIG. 4A, when thermal expansion of the liquid has been caused in a first liquid tank 21 by irradiation of the laser light 5, in the conduit 1 on the check valve 41 side, the valve is closed so as to stop the liquid, and the liquid is pushed to a first conduit 11 on the restrictor 31 side by the thermal expansion. The pushed liquid does not move to the second conduit 12 side where a restrictor 32 is provided, but flows out from the third conduit 13.

Figure 4B:
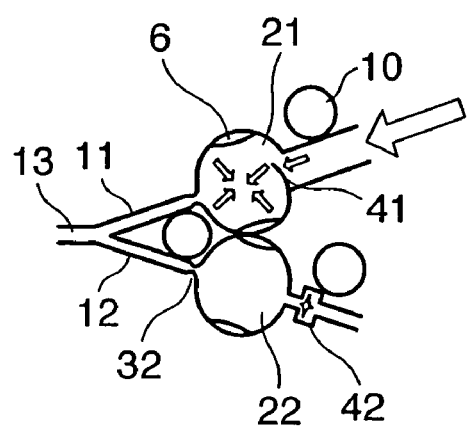

Next, as shown in FIG. 4B, when the irradiation of the laser light 5 has been stopped and volume contraction of the liquid has been caused in the liquid tank 21, the check valve 41 is opened and the liquid flows into the first liquid tank 21. As the conduit on the restrictor 31 side has a higher conduit resistance than that of the check valve 41 in the open status, inflow from the restrictor 31 side almost does not occur. Accordingly, by repeating the irradiation of the laser light 5 and stoppage of the irradiation, the liquid flows from the check valve 41 side to the restrictor 31 side.

Figure 4C:
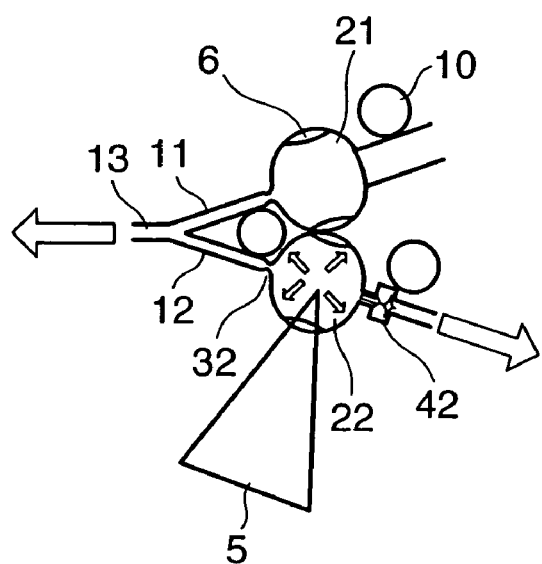
Figure 4D:
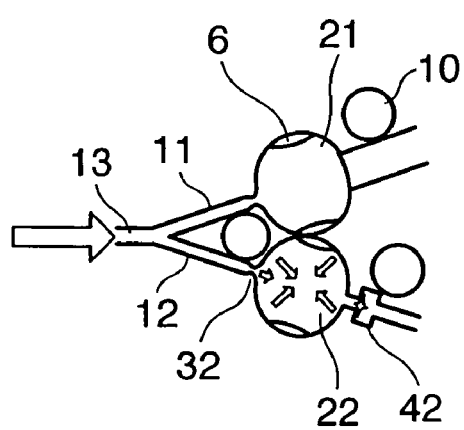

Next, as shown in FIG. 4C, when volume expansion of the liquid has been caused in a second liquid tank 22 by irradiation of the laser light 5, a check valve 42 is opened and the liquid flows out from the conduit 1. As the conduit on the restrictor 32 side has a higher conduit resistance than that of the check valve 42 in the open status, outflow from a restrictor 32 side almost does not occur. Next, as shown in FIG. 4D, when the irradiation of the laser light 5 has been stopped and volume contraction of the liquid has been caused in the second liquid tank 22, the check valve 42 is closed and the liquid flows into the liquid tank 22 from the second conduit 12 on the restrictor 32 side. The liquid flows in not from the first conduit 11 side where the restrictor 31 is provided but from a released third conduit 33 side. Accordingly, by repeating the irradiation of the laser light 5 and stoppage of the irradiation, the liquid flows from the restrictor 32 side to the check valve 42 side.

As described above, the liquid bidirectionally flows in/out with respect to the third conduit 13. The usage of the beads 10 for laser trapping is the same as that in the first embodiment. Further, other elements corresponding to those of the first embodiment are the same.

Third Embodiment

FIGS. 5A to 5C are schematic diagrams showing the structure and operation of the fluid control mechanism according to a third embodiment of the present invention. The third embodiment differs from the first embodiment in that a second liquid tank 22 is provided in a conduit on the restrictor 3 side. In the first embodiment, the fluid is driven in only one fluid driving direction, whereas in the third embodiment, the fluid is bidirectionally driven with respect to the conduit 1 on the second liquid tank 22 side.

As shown in FIG. 5A, when volume expansion of the liquid has been caused in a first liquid tank 21 by irradiation of the laser light 5, the check valve 4 is opened and the liquid flows out from the conduit 1. As the conduit on the restrictor 3 side has a higher conduit resistance than that of the check valve 4 in the open status, outflow from the restrictor 3 side almost does not occur. Next, as shown in FIG. 5B, when the irradiation of the laser light 5 has been stopped and volume contraction of the liquid has been caused in the first liquid tank 21, the check valve 4 is closed and the liquid flows into the first liquid tank 21 from the conduit 1 on the restrictor 3 side. Accordingly, by repeating the irradiation of the laser light 5 and stoppage of the irradiation, the liquid flows from the restrictor 3 side to the check valve 4 side.

Next, as shown in FIG. 5C, when volume expansion of the liquid has been caused in the second liquid tank 22 by irradiation of the laser light 5, as the conduit on the restrictor 3 side has a high conduit resistance, the liquid is pushed to the opposite side by the expansion. Note that even if the irradiation of the laser light 5 is stopped, as the liquid flows in not from the restrictor 3 side but from the released side, the liquid does not flow from the check valve 4 side to the restrictor 3 side.

As described above, the liquid flows in and temporarily flows out from the conduit 1 on the restrictor 3 side. For example, by the inflow of the liquid from the restrictor 3 side, a cell, attached to a micro tool, can be separated from the micro tool by the liquid discharged by laser emission on the second liquid tank 22. The usage of the beads 10 for laser trapping is the same as that in the first embodiment. Further, other elements corresponding to those of the first embodiment are the same.

Fourth Embodiment

Figure 6A:
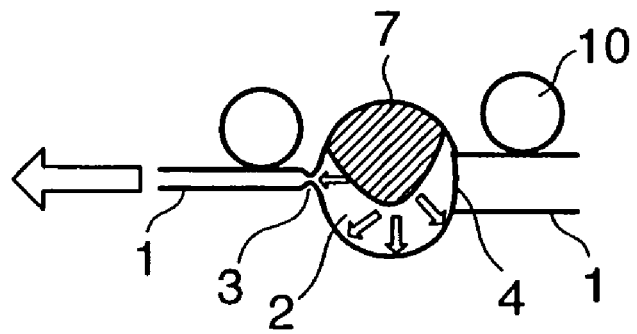
FIGS. 6A and 6B are schematic diagrams showing the fluid control mechanism according to a fourth embodiment of the present invention.
Figure 6B:
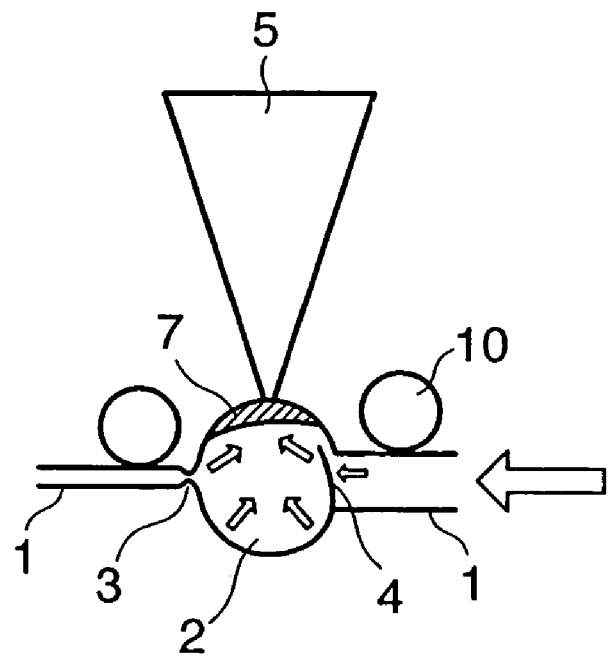

FIGS. 6A and 6B are schematic diagrams showing the fluid control mechanism according to a fourth embodiment of the present invention. The fourth embodiment differs from the first embodiment in that the liquid tank 2 is filled with polymer gel 7 such as PNIPAM (poly-N-isopropyl acrylamide). It is known that volume phase change of the polymer gel 7 is caused by temperature change or laser radiation pressure. In the present embodiment, the polymer gel 7 contracts with temperature rise or radiation pressure by irradiation of the laser light 5. Even in a case where the liquid in the liquid tank 2 cannot be directly heated due to its characteristic, volume change of the liquid can be caused.

Also in this embodiment, the ball-shaped liquid tank 2 is formed in the middle of the minute conduits 1 of glass or the like, and the restrictor 3 is formed in the conduit 1 on one side of the liquid tank 2 by e.g. narrowing a part of the conduit. The restrictor 3 is formed such that its conduit resistance is higher than that of the check vale 4 formed in the other conduit in an open status. As shown in FIG. 6, the check valve 4 may be an elastic member with one fixed end. Further, the check valve 4 may have other structures.

Next, the operation of the fluid control mechanism of the present embodiment will be described with reference to FIGS. 6A and 6B. As shown in FIG. 6A, when irradiation of the laser light 5 is not performed, the polymer gel 7 has a large volume. In this status, in the conduit 1 on the check valve 4 side, the valve is closed to stop the liquid, and the liquid is pushed to the conduit 1 on the restrictor 3 side by expansion. Next, as shown in FIG. 6B, when irradiation of the laser light 5 is made, contraction of the polymer gel 7 is caused by volume phase change in the liquid tank 2, then the check valve 4 is opened and the liquid flows in the liquid tank 2. As the conduit on the restrictor 3 side has a higher conduit resistance than that of the check valve 4 in the open status, inflow from the restrictor 3 side almost does not occur. In this status, when the irradiation of the laser light 5 is stopped again, volume expansion of the polymer gel 7 is caused then the gel turns to the state in FIG. 6A, and the liquid in the liquid tank 2 is pushed out from the restrictor 3 side. Accordingly, by repeating the irradiation of the laser light 5 and stoppage of the irradiation, the liquid flows from the check valve 4 side to the restrictor 3 side.

The operation of the check valve 4 to allow the liquid to flow only in the inflow direction from the liquid tank 2 is the same as that described in FIGS. 3A and 3B.

As described above, in use of polymer gel, the operation upon laser irradiation is reverse of that in use of the volume expansion in FIG. 1A and 1B. Further, in the polymer gel, as a large amount of volume change is caused only with a little temperature change by radiation pressure under a predetermined condition, fluid control can be very efficiently performed. Further, as it is not necessary to heat the solution in the liquid tank, the use of polymer gel is effective to suppress the influence of heat on handled liquid such as change of composition. The usage of the beads 10 for laser trapping is the same as that in the first embodiment. Further, other elements corresponding to those of the first embodiment are the same.

As described above, in the fluid control mechanism having a liquid tank holding liquid and its method according to the present invention, liquid inflow/outflow can be controlled via a liquid passing port, with a comparatively simple structure or method, without power supply means physically connected to the outside. As various liquid controls can be realized, the fluid control mechanism or method is applicable in a wide range including the fields of micro tool and microchip.

The present invention is not limited to the above embodiments and various changes and modifications can be made within the spirit and scope of the present invention. Therefore, to appraise the public of the scope of the present invention, the following claims are made.

What is claimed is:

1. A fluid control mechanism comprising:
    a laser irradiation control unit to control irradiation of a light beam generated by a laser generation unit;
    a liquid tank unit, having at least one liquid passing port, to hold liquid;
    at least one conduit through which liquid inflows or outflows, connected to said liquid tank unit via said at least one liquid passing port, to pass the liquid;
    a lens to collect the light beam in said liquid tank unit; and
    a light trap unit contacting said at least one conduit for positioning said at least one conduit,
    wherein said laser irradiation control unit i) emits the light beam to said lens to collect the light beam with said lens, to cause thermal expansion of the liquid in said liquid tank unit, thereby controlling inflow/outflow of the liquid via the at least one liquid passing port, and ii) emits the light beam to said light trap unit to be trapped by said light trap unit, thereby controlling a position of said at least one conduit.

2. The fluid control mechanism according to claim 1, wherein said liquid tank unit has plural liquid passing ports,
    and wherein the at least one liquid passing port is provided with a restrictor,
    further wherein at least one of other liquid passing ports is provided with a check valve to limit a liquid moving direction to one direction.

3. The fluid control mechanism according to claim 1, wherein said liquid tank unit has at least first and second liquid tanks,
    wherein said first liquid tank is connected to a first conduit via a liquid passing port having a restrictor and connected to a second conduit via a liquid passing port having a first check valve,
    and wherein said second liquid tank is connected to a third conduit via a liquid passing port having a restrictor and connected to a fourth conduit via a liquid passing port having a second check valve,
    further wherein said first and second check valves have mutually opposite passing directions, and said first and third conduits are connected to a fifth conduit,
    and wherein said laser irradiation control unit emits the light beam to said first and second liquid tanks, thereby causing the liquid to bidirectionally inflow/outflow with respect to said fifth conduit.

4. The fluid control mechanism according to claim 1, wherein said liquid tank unit has at least first and second liquid tanks,
    wherein said first liquid tank is connected to a first conduit via a liquid passing port having a restrictor and connected to a second conduit via a liquid passing port having a check valve with only an outflow passing direction,
    and wherein a liquid moving direction is limited to a direction from said first conduit to said first liquid tank,
    further wherein said second liquid tank is provided in said first conduit in front of said restrictor,
    and wherein said laser irradiation control unit emits the light beam to said first and second liquid tanks, thereby causing the liquid to bidirectionally inflow/outflow with respect to said first conduit.

* * * * *